United States Patent
Klose et al.

(10) Patent No.: US 12,077,629 B2
(45) Date of Patent: Sep. 3, 2024

(54) ISOCYANATE COMPOSITION AND BINDER SYSTEM CONTAINING SAID ISOCYANATE COMPOSITION

(71) Applicant: HÜTTENES-ALBERTUS Chemische Werke Gesellschaft mit beschränkter Haftung, Düsseldorf (DE)

(72) Inventors: Annika Klose, Hannover (DE); Markus Schabrucker, Düsseldorf (DE)

(73) Assignee: HÜTTENES-ALBERTUS Chemische Werke Gesellschaft mit beschränkter Haftung, Düsseldorf (DE)

( * ) Notice: Subject to any disclaimer, the term of this patent is extended or adjusted under 35 U.S.C. 154(b) by 549 days.

(21) Appl. No.: 17/298,986

(22) PCT Filed: Dec. 10, 2019

(86) PCT No.: PCT/EP2019/084470
§ 371 (c)(1),
(2) Date: Jun. 2, 2021

(87) PCT Pub. No.: WO2020/126689
PCT Pub. Date: Jun. 25, 2020

(65) Prior Publication Data
US 2022/0064362 A1    Mar. 3, 2022

(30) Foreign Application Priority Data
Dec. 20, 2018 (DE) .......................... 102018133239.4

(51) Int. Cl.
*B22C 1/22* (2006.01)
*C08G 18/08* (2006.01)
*C08G 18/54* (2006.01)
*C08G 18/76* (2006.01)
*C08J 7/05* (2020.01)

(52) U.S. Cl.
CPC .......... *C08G 18/542* (2013.01); *B22C 1/2273* (2013.01); *C08G 18/0842* (2013.01); *C08G 18/7671* (2013.01); *C08J 7/05* (2020.01); *C08J 2375/04* (2013.01)

(58) Field of Classification Search
CPC ............. B22C 1/2273; C08G 18/2895; C08G 18/542; C08G 18/7664; C08G 18/797
See application file for complete search history.

(56) References Cited

U.S. PATENT DOCUMENTS

| | | | |
|---|---|---|---|
| 4,273,179 A | 6/1981 | Gardikes | |
| 6,288,139 B1 | 9/2001 | Skoglund | |
| 6,465,542 B1 | 10/2002 | Torbus | |
| 10,011,677 B2 | 7/2018 | Yamashita | |
| 2007/0135608 A1 | 6/2007 | Hannig | |
| 2008/0071055 A1 | 3/2008 | Adkins | |
| 2011/0190431 A1* | 8/2011 | Savino | C08G 18/089 524/357 |
| 2011/0269902 A1 | 11/2011 | Strunk | |
| 2011/0315911 A1 | 12/2011 | Lanver | |
| 2012/0126092 A1 | 5/2012 | Jattke | |
| 2013/0225718 A1 | 8/2013 | Ladegourdie | |
| 2013/0248138 A1 | 9/2013 | Cornelissen | |
| 2018/0126449 A1 | 5/2018 | Vargas | |
| 2019/0091758 A1 | 3/2019 | Ladégourdie | |
| 2019/0359759 A1 | 11/2019 | Priebe | |
| 2021/0087327 A1* | 3/2021 | Priebe | C08G 18/7664 |

FOREIGN PATENT DOCUMENTS

| | | |
|---|---|---|
| CN | 102114521 | 7/2011 |
| CN | 104387554 | 3/2015 |
| DE | 102012200967 | 7/2013 |
| DE | 102015107016 | 6/2016 |
| DE | 102018118291 | 1/2020 |
| EP | 0054294 | 10/1985 |
| EP | 3333205 | 6/2018 |
| JP | 2006192476 | 7/2006 |
| WO | WO-2016165916 A1 * | 10/2016 ........... B22C 1/2253 |
| WO | WO-2019137583 A1 * | 7/2019 ......... B29C 33/3807 |

OTHER PUBLICATIONS

Huang, R., et al., "The Choice of Solvent in Foundry Polyurethance Binder and Developmental Directio of It's Binders," Foundry, Nov. 2007, vol. 56, No. 11, pp. 1195.
Kunststoff-Handbuch [Plastics Handbook], vol. 7, "Polyurethane" [Polyurethanes] (Carl Hanser Verlag Munich Vienna 1993).
"Synthetic Methods in Step-Growth Polymers" (edited by Martin E. Rogers and Timothy Long, Wiley 2003).
"Phenolic Resins: A century of progress" (editor: L. Pilato, publisher: Springer, year of publication: 2010).
VDG—Leaflet, Merkblatt [German Society of Foundry Specialists information sheet] R305 "Urethan-Cold-Box-Verfahren" [Urethane Cold Box Process] (Feb. 1998).
Nwaogu, U., et al., "Foundry Coating Technology: A Review," Materials Sciences and Applications, vol. 2 No. 8, 2011, pp. 1143-1160. doi: 10.4236/msa.2011.28155.

* cited by examiner

*Primary Examiner* — Kevin E Yoon

(74) *Attorney, Agent, or Firm* — DUANE MORRIS LLP; Gregory M. Lefkowitz; Brandon A. Chan

(57) ABSTRACT

What is described are isocyanate compositions comprising β-dicarbonyl compounds and a binder system, especially for use in a process from the group consisting of polyurethane cold-box process and polyurethane no-bake process, with this isocyanate composition as polyisocyanate component.

13 Claims, No Drawings

ISOCYANATE COMPOSITION AND BINDER SYSTEM CONTAINING SAID ISOCYANATE COMPOSITION

CROSS-REFERENCE TO RELATED APPLICATIONS

This application is a § 371 national stage entry of International Application No. PCT/EP2019/084470, filed on Dec. 10, 2019, which claims priority to German Patent Application No. 10 2018 133 239.4, filed on Dec. 20, 2018, the entire contents of which are incorporated herein by reference.

The present invention relates to an isocyanate composition, especially for use in a process from the group consisting of polyurethane cold-box process and polyurethane no-bake process, to a binder system, especially for use in a process from the group consisting of polyurethane cold-box process and polyurethane no-bake process, to a process in which a binder system of the invention is used, and to articles from the group consisting of foundry molds and foundry cores. The present invention further relates to the use of β-dicarbonyl compounds for production of isocyanate compositions of the invention, to the use of an isocyanate composition of the invention for production of a binder system of the invention, and to the use of a binder system of the invention for production of articles from the group consisting of foundry molds, foundry cores and feeders.

In the production of feeders, foundry molds and foundry cores, the molding material base is frequently bound using binder systems that undergo cold curing to form polyurethane. These binder systems consist of two components: a polyol (normally dissolved in a solvent) having at least two OH groups in the molecule (polyol component), and a polyisocyanate (dissolved in a solvent or in solvent-free form) having at least two isocyanate groups in the molecule (polyisocyanate component). The polyol component is usually a phenolic resin dissolved in a solvent. The polyol component is therefore referred to hereinafter as phenolic resin component. The two binder components that are added to and mixed with a molding material base for production of a molding material mixture react in the molded molding material mixture in a polyaddition reaction to give a polyurethane binder. The binder system is cured in the presence of basic catalysts, preferably in the form of tertiary amines which are introduced into the mold together with a carrier gas after the molding material mixture has been molded (polyurethane cold-box process), or which are added as a solution before the molding material mixture has been molded (polyurethane no-bake process). Binder systems of this kind are described, for example, in patent applications WO 2017/153474 A1 and WO 2016/165916 A1.

Processing of phenol-formaldehyde resins is not possible with complete avoidance of emission of formaldehyde. These emissions in the processing of phenol-formaldehyde resins, but also vaporization and outgassing of formaldehyde from feeders, foundry cores and foundry molds produced by the polyurethane cold-box or polyurethane no-bake process, constitute considerable pollution of the workplace that usually cannot be absorbed sufficiently by protective measures such as fume hoods or the like.

The release of formaldehyde from such feeders, foundry cores and foundry molds is especially promoted by elevated temperature. It is true that the binder system is cured without supply of heat in the polyurethane cold-box process and in the polyurethane no-bake process. However, the conditions that exist when feeders, foundry cores and foundry molds are used in metal casting are always such that formaldehyde is emitted.

In particular cases, the production of feeders, foundry cores and foundry molds includes steps that follow the curing of the binder system in which moldings produced by the polyurethane cold-box process or by the polyurethane no-bake process are subjected to an elevated temperature.

Especially in steel and iron casting, preference is given to using foundry molds and foundry cores having surfaces having regions in which a coating comprising particles of one or more refractories is disposed. This coating forms the surface of the mold or the core that comes into contact with a metal melt in the casting operation. Such a coating is typically referred to as refractory coating or coating on the basis of a refractory coating. This coating acts as an interface and/or barrier layer with respect to the cast metal, and serves, inter alia, to suppress mechanisms of casting defect formation at the interface between metal and core or mold and/or for controlled utilization of metallurgical effects. In general, refractory coatings in foundry technology are intended to fulfill the following functions in particular that are known to the person skilled in the art:

improvement of the smoothness of the casting surface and/or avoidance of chemical reactions between constituents of the molding material mixture and the metal melt, hence facilitating separation between mold/core and casting, and/or avoidance of surface defects on the casting, for example gas bubbles, penetra-tion, veining and/or scabs.

Ready-to-use compositions (typically referred to in practice as refractory-coating compositions) for production of coatings for foundry molds and foundry cores are usually suspensions of fine-grain refractory to highly refractory inorganic materials (refractories) in a carrier liquid (e.g. water, alkanols, or mixtures of water and one or more alkanols), often with further constituents suspended or dissolved in the carrier liquid. For production of a foundry mold or foundry core, the refractory-coating composition is applied to the corresponding surface regions of a molding, and then the carrier liquid is removed by thermal treatment, forming a coating. The carrier liquid is typically removed at a temperature above 40° C., preferably in the range from 50° C. to 200° ° C. At these temperatures, moldings that have been produced from a molding material mixture comprising a binder system that cures to form a polyurethane emit significant amounts of formaldehyde. Such emissions constitute considerable pollution of the workplace.

It is an object of the present invention to reduce the emissions of formaldehyde which is released especially (but not just) under thermal stress from feeders, foundry cores and foundry molds that have been produced from a molding material mixture having a binder system comprising a phenolic resin component and a polyisocyanate component.

In a first aspect of the invention, this object is achieved by an isocyanate composition, especially for use in a process from the group consisting of polyurethane cold-box and polyurethane no-bake process, comprising a) one or more isocyanates having at least two isocyanate groups per molecule
b) one or more β-dicarbonyl compounds
c) a solvent which is not an isocyanate, a 3-dicarbonyl compound or an aldehyde, where the concentration
a) of the isocyanates is 60% to 89%, preferably 70% to 88%, more preferably 75% to 86%, b) of the β-dicarbonyl compounds is 1% to 38%, preferably 1% to 20%, more preferably 1% to 10% and most preferably 1% to 5%, based in each case on the total mass of the isocyanate composition.

Isocyanates having two or more isocyanate groups per molecule are generally referred to as polyisocyanates. Isocyanates having exactly two isocyanate groups per molecule are specifically referred to as diisocyanates.

The isocyanates a) having at least two isocyanate groups per molecule are preferably selected from the group consisting of methylenebis(phenyl isocyanates) (abbreviated to MDI; these are often referred to in practice as diphenylmethane diisocyanates), preferably 4,4'-meth-ylenebis(phenyl isocyanate), polymethylene polyphenyl isocyanates (also referred to as "polymeric MDI"), aliphatic isocyanates, cycloaliphatic isocyanates, isocyanates having at least two isocyanate groups and one carbodiimide group per molecule (also referred to as carbodiimide-modified di- or polyisocyanates), preferably carbodiimide-modified MDI, isocyanates having at least two isocyanate groups and one uretonimine group per molecule (also referred to as uretonimine-modified di- or polyisocyanates), preferably uretonimine-modified MDI.

The expression "polymeric MDI" also includes mixtures of different polymethylene polyphenyl isocyanates.

Structure and preparation of carbodiimide-modified di- or polyisocyanates and uretonimine-modified di- or polyisocyanates are known to those skilled in the art and are described inter alia in the Kunststoff-Handbuch [Plastics Handbook], volume 7 "Polyurethane" [Polyurethanes] (Carl Hanser Verlag Munich Vienna 1993), in the textbook "Synthetic Methods in Step-Growth Polymers" (edited by Martin E. Rogers and Timothy Long, Wiley 2003), and, for example, in EP 0054294B1, WO 2007/065578A1, and U.S. Pat. No. 10,011,677 B2. The use of carbodiimide- and/or uretonimine-modified MDI in a process from the group consisting of polyurethane cold-box process and polyurethane no-bake process is described inter alia in EP 2 640 764 B1.

It is possible to use mixtures of various isocyanates a) having at least two isocyanate groups per molecule, for example mixtures of MDI and polymeric MDI mixtures of MDI with carbodiimide-modified MDI and/or uretonimine-modified MDI mixtures of polymeric MDI with carbodiimide-modified MDI and/or uretonimine-modified MDI.

The expression "β-dicarbonyl compounds" b) (beta-dicarbonyl compounds), in accordance with its usual meaning in the field of chemistry, refers to organic compounds having two carbonyl groups C=O per molecule, where the carbon atoms of the two carbonyl groups are joined to one another by a single carbon atom that is not part of a carbonyl group.

By reactions with formaldehyde, β-dicarbonyl compounds are capable of binding molecular formaldehyde to form nonvolatile reaction products, i.e. they act as formaldehyde scavengers. This effect of β-dicarbonyl compounds is described in patent application WO 2016/165916 A1 inter alia.

Since no formaldehyde is present in the isocyanate composition of the invention, the reaction mentioned of the β-dicarbonyl compounds b) with formaldehyde only occurs when the β-dicarbonyl compounds b) present in the isocyanate composition of the invention come into contact with molecular formaldehyde. This is the case, for example, when, in the production of a molding material mixture, the isocyanate composition of the invention as polyisocyanate component (ii) of a binder system that cures to form polyurethane is combined with a phenolic resin component (i) having a significant concentration of molecular formaldehyde (see below for details), or when a molding produced from such a molding material mixture is subjected to thermal stress.

It is preferable in accordance with the invention to produce moldings by using a binder system wherein the phenolic resin component (i) has a very low concentration of molecular formaldehyde (see below for details), and by curing the binder system without supply of heat by a process selected from the group consisting of polyurethane cold-box process and polyurethane no-bake process (see below for details). But even moldings thus produced have a tendency to release formaldehyde over the course of time, especially under thermal stress. This is bound by reaction with the β-dicarbonyl compound(s) present in accordance with the invention in the polyisocyanate component (ii) of the binder system to form nonvolatile reaction products, such that the emission of formaldehyde is reduced.

The β-dicarbonyl compounds are preferably selected from the group of the dialkyl esters of malonic acid (dialkyl malonates), where the alkyl groups are independently selected from alkyl groups having 1 to 4 carbon atoms. Particular preference is given to diethyl malonate and dimethyl malonate.

Typical reaction products of dialkyl malonates with formaldehyde are, for example, 2-methylenemalonic esters, 2,2-bis(hydroxymethyl)malonic esters, 2-(hydroxyme-thyl)malonic esters and 2-(3-hydroxy-2-oxapropyl)malonic esters. For further details, reference should be made to patent application WO 2016/165916 A1.

The expression "solvents c)" includes both individual compounds that act as solvents and mixtures of different compounds that act as solvents. The solvent c) is a liquid in which constituents a) and b) and any further constituents of the isocyanate composition of the invention, if they are solids, are dissolved and with which constituents a) and b) and any further constituents of the isocyanate composition of the invention, if they are liquids, are miscible, such that the isocyanate composition consists of a single liquid phase. The solvent c) is especially suitable for adjusting the viscosity of the isocyanate composition such that mixing with a molding material base is facilitated. The solvent c) is not a compound from the group consisting of isocyanates, β-dicarbonyl compounds and aldehydes. The solvent c) does not comprise any compound from the group consisting of isocyanates, β-dicarbonyl compounds and aldehydes.

The solvent c) is preferably selected from the group consisting of dialkyl esters of $C_4$-$C_6$ dicarboxylic acids (frequently referred to in practice as "dibasic esters"), preferably from the group consisting of dimethyl adipate, dimethyl glutarate, and dimethyl succinate, saturated and unsaturated fatty acid alkyl esters, preferably vegetable oil alkyl esters, preferably from the group consisting of rapeseed oil methyl ester, tall oil methyl ester, tall oil butyl ester, methyl laurate, isopropyl laurate, isopropyl myristate, and isobutyl myristate, alkylene carbonates, preferably propylene carbonate, hydrocarbons that are liquid at 25° C. and 101.325 kPa, preferably from the group consisting of cycloalkanes, alkanes having 6 to 22 carbon atoms and aromatic hydrocarbons, where the aromatic hydrocarbons are preferably selected from the group consisting of alkylbenzenes, alkenylbenzenes, dialkylnaphthalenes and dialkenylnaphthalenes, compounds from the group of the alkylsilanes, alkyl/alkoxysilanes, alkoxysilanes, alkylsiloxanes, alkyl/alkoxysiloxanes and alkoxysiloxanes of the formula (I)

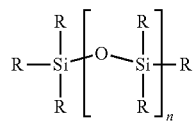
(I)

where, in formula (I),
n is an integer from 0 to 20, and
each R, independently of the other R, is selected from the group of the alkyl groups having one to 6 carbon atoms and the alkoxy groups having one to 6 carbon atoms, and mixtures thereof.

Compounds of the formula (I) in which n=0 and all R groups are alkyl groups are alkylsilanes. Compounds of the formula (I) in which n=0 and all R groups are alkoxy groups are alkoxysilanes (also referred to as alkyl silicates). Compounds of the formula (I) in which n=0 and one or more R groups are alkyl groups and the rest of the R groups are alkoxy groups are alkyl/alkoxysilanes. Compounds of the formula (I) in which n>0 and all R groups are alkyl groups are alkylsiloxanes. Compounds of the formula (I) in which n>0 and all R groups are alkoxy groups are alkoxysiloxanes. Compounds of the formula (I) in which n>0 and one or more R groups are alkyl groups and the rest of the R groups are alkoxy groups are alkyl/alkoxysiloxanes. Preferred compounds of the formula (I) are alkoxysilanes (alkyl silicates) (i.e., in formula (I), n=0) and alkoxysiloxanes (alkyl silicate oligomers) in which n is an integer from 2 to 5, where the alkoxy groups are preferably ethoxy, propoxy or butoxy groups. Particular preference is given to tetraethyl orthosilicate (TEOS) and ethoxysiloxanes in which n is an integer from 2 to 5.

The expression "hydrocarbons", in accordance with its usual meaning in the field of chemistry, refers to organic compounds consisting solely of carbon and hydrogen.

Particular preference is given to isocyanate compositions in which
a) one or more (preferably all) isocyanates having at least two isocyanate groups per molecule are selected from the group of preferred isocyanates as described above, and
b) one or more (preferably all) β-dicarbonyl compounds are selected from the group of the dialkyl malonates, and
c) the solvent is selected from the group of preferred solvents as described above.

Especially preferred are isocyanate compositions comprising
a) one or more isocyanates from the group consisting of MDI, polymeric MDI, car-bodiimide-modified MDI and uretonimine-modified MDI and mixtures thereof, where the total concentration of the isocyanates a) mentioned is 75% to 85%, and
b) one or more β-dicarbonyl compounds from the group consisting of diethyl malonate and dimethyl malonate, where the total concentration of the β-dicarbonyl compounds b) mentioned is 1% to 5%, and c) as solvent
one or more compounds from the group of the alkoxysilanes (alkyl silicates) of formula (I) as defined above (i.e., in formula (I), n=0) and alkoxysiloxanes (alkyl silicate oligomers) of formula (I) as defined above, in which n is an integer from 2 to 5, where the alkoxy groups are preferably ethoxy groups, preferably tetraethyl orthosilicate,
or
one or more compounds from the group of the alkylene carbonates (preferably propylene carbonate) and the fatty acid alkyl esters (preferably from the group consisting of rapeseed oil methyl ester and tall oil methyl ester),
where the concentration of the solvent c) is 5% to 24%,
where the concentration of constituents a), b) and c) is based in each case on the total mass of the isocyanate composition.

In particular cases, the isocyanate composition of the invention contains further constituents d).

For instance, it is preferable in some cases that the polyisocyanate component of the invention comprises
d) one or more substances from the group consisting of silanes,
acid chlorides, e.g. phosphoryl chloride, phthaloyl chloride,
chlorosilanes,
methanesulfonic acid,
esters of phosphorus-oxygen acids,
additive preparable by reacting a preliminary mixture of
(av) 1.0% to 50.0% methanesulfonic acid
(bv) one or more esters of one or more phosphorus-oxygen acids, where the total amount of the esters (bv) is in the range from 5.0% to 90.0%,
(cv) one or more silanes selected from the group consisting of aminosilanes, epoxysilanes, mercaptosilanes and ureidosilanes, where the total amount of the silanes (cv) is in the range from 5.0% to 90.0%,
where the proportion of water is not more than 0.1%, based in each case on the total amount of constituents (av), (bv) and (cv) in the preliminary mixture.

The abovementioned constituents d) serve essentially, by inhibiting polyurethane formation, to extend the period of time over which a molding material mixture into which the two components of the binder system have been mixed can be stored in spite of the high reactivity of the binder system ("sand lifetime") without becoming unusable, i.e. no longer being moldable. Long sand lifetimes are desirable in order that a prepared batch of a molding material mixture does not become unusable through premature curing of the binder system. The abovementioned additives are also referred to as bench life extenders and are known to those skilled in the art. What are conventionally used are in particular acid chlorides from the group consisting of phosphoryl chloride POCl$_3$ (CAS No. 10025-87-3), o-phthaloyl chloride (benzene-1,2-dicarbonyl chloride, CAS No. 88-95-9) and benzene phosphorus oxydichloride (CAS No: 842-72-6). Further suitable additives are methanesulfonic acid and phosphorus-oxygen acids, preferably from the group consisting of phosphinic acid, phosphonic acid, phosphoric acid, peroxophosphoric acid, hypodiphosphonic acid, diphosphonic acid, hypodiphosphoric acid, diphosphoric acid and peroxodiphosphoric acid. A preferred additive that extends the sand lifetime is an additive mixture preparable by reacting a preliminary mixture of the abovementioned components (av), (bv) and (cv) as described in patent application WO 2013/117256.

In some cases, the isocyanate composition of the invention comprises one or more further constituents d) from the group of plasticizers.

Based on the total mass of the isocyanate composition of the invention, the total concentration of all substances d) is 5% or less, preferably 3% or less.

A second aspect of the present invention relates to a binder system, especially for use in a process from the group consisting of the polyurethane cold-box process and the polyurethane no-bake process, wherein the binder system comprises:
(i) a phenolic resin component and
(ii) a separate polyisocyanate component,
wherein
(i) the phenolic resin component comprises:
   e) one or more phenolic resins
   f) a solvent,
   wherein, based on the total mass of the phenolic resin component, the concentration of the phenolic resins e) is 40% to 60%, preferably 45% to 60%, more preferably 48% to 55%,
and
(ii) the polyisocyanate component is an isocyanate composition according to the above-described first aspect of the present invention.

The binder system of the invention for use in the polyurethane cold-box process or in the polyurethane no-bake process preferably consists of
(i) a phenolic resin component as defined above and
(ii) a separate polyisocyanate component as defined above.

In the binder system of the invention, the stoichiometric ratio of isocyanate groups in the polyisocyanate component (ii) to hydroxyl groups in the phenolic resin component (i) is preferably in the range from 0.5 to 1.5, further preferably in the range from 0.6 to 1.4, more preferably in the range from 0.7 to 1.3, particularly preferably in the range from 0.8 to 1.2, very particularly preferably in the range from 0.9 to 1.1, especially preferably in the range from 0.95 to 1.05. While it is preferable in many cases that the stoichiometric ratio of isocyanate groups in the polyisocyanate component (ii) to hydroxyl groups in the phenolic resin component (i) is close to 1, there are also cases in which it is advantageous that there is an excess of isocyanate groups relative to the hydroxyl groups, and also cases in which it is advantageous that there is an excess of hydroxyl groups relative to isocyanate groups.

With regard to preferred features and embodiments of the isocyanate composition that forms the polyisocyanate component (ii) of the binder system of the invention, the above remarks are applicable to the first aspect of the present invention.

In the binder system of the invention, the phenolic resin component (i) and the polyisocyanate component (ii) are separate from one another, meaning that they are in separate vessels, since the addition reaction (polyurethane formation) between the phenolic resin of the phenolic resin component (i) and the polyisocyanate of the polyisocyanate component (ii) should not occur until both components have been mixed in a molding material mixture with a molding material base and optionally further constituents of the molding material mixture to be produced, and this molding material mixture has been molded.

The expression "solvents f)" includes both individual compounds that act as solvents and mixtures of different compounds that act as solvents. The solvent f) is a liquid in which constituent e) and any further constituents of the phenolic resin component (i), if they are solids, are dissolved and with which constituent e) and any further constituents of the phenolic resin component (i), if they are liquids, are miscible, such that the phenolic resin component consists of a single liquid phase. The solvent f) is especially suitable for adjusting the viscosity of the phenolic resin component (i) such that mixing with a molding material base is facilitated.

Phenolic resins are condensation products of one or more phenol monomers of the general formula (II)

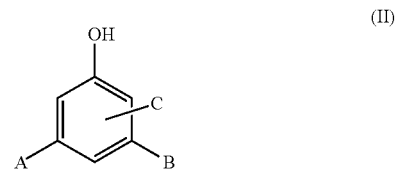

(II)

with one or more aldehydes of the general formula R'CHO in which R' is a hydrogen atom or an alkyl group having 1 to 8 carbon atoms. In formula (II), A, B and C are independently selected from the group consisting of hydrogen, unsaturated aliphatic groups having not more than 16 carbon atoms, and saturated aliphatic groups having not more than 16 carbon atoms. The aliphatic groups here are preferably alkyl groups, preferably from the group consisting of methyl, ethyl, n-propyl, i-propyl, n-butyl, i-butyl, tert-butyl, octyl and nonyl, or alkenyl groups, preferably from the group consisting of pentadecenyl, pentadecadienyl and pentadecatrienyl. Preference is given to phenol monomers of the formula (II) in which at least one of substituents A, B and C, preferably two of substituents A, B and C or all of substituents A, B and C, are hydrogen.

Phenol monomers that are suitable for the preparation of phenolic resins and are cov-ered by the formula (II) are, for example, phenol (hydroxybenzene $C_6H_5OH$), alkylphe-nols, for example o-cresol, m-cresol, p-cresol, p-butylphenol, p-octylphenol, p-nonylphenol, and cardanol (name for compounds of the formula (II) where A and C are hydrogen and B is an aliphatic unbranched alkenyl group having 15 carbon atoms and 0, 1, 2 or 3 double bonds).

Phenol (hydroxybenzene $C_6H_5OH$), o-cresol, cardanol and mixtures thereof are preferred phenol monomers for the preparation of phenolic resins. A preferred aldehyde for the preparation of phenolic resins is formaldehyde, which can also be used in the form of paraformaldehyde. Formaldehyde is used either as the sole aldehyde or in combination with one or more further aldehydes.

The phenolic resin component (i) of the binder system of the invention preferably comprises a phenolic resin e) in the form of an ortho-fused resol. "Ortho-fused resol" refers to a phenolic resin wherein the molecules have
   aromatic rings formed from phenol monomers and linked by methylene ether bridges in the ortho, ortho' position and terminal methylol groups arranged in the ortho position, where the terminal methylol groups may be etherified.

The expression "ortho" refers to the ortho position and the ortho' position in relation to the hydroxyl group of the phenol. It is not impossible here that, in the molecules of the ortho-fused resols to be used with preference in accordance with the invention, there are also aromatic rings linked by methylene groups (as well as the aromatic rings linked by methylene ether bridges). It is likewise not impossible that, in the molecules of the ortho-fused resols to be used with preference in accordance with the invention, there are also terminal hydrogen atoms or terminal methyl groups (when o-cresol is used as an additional reactant, see below) in the ortho position (as well as terminal methylol groups in the ortho position). In the molecules of the ortho-fused resols that are used with preference in accordance with the invention, the ratio of methylene ether bridges to methylene bridges is 1:1 or greater, and the ratio of terminal methylol groups in the ortho position to terminal hydrogen atoms or terminal methyl groups in the ortho position is likewise 1:1 or greater. Such phenolic resins are also referred to as benzyl ether resins. The structure of such ortho-fused resol is represented by the general formula (III):

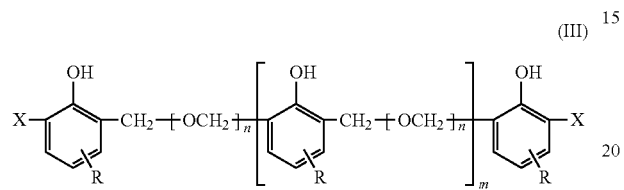

(III)

In formula (III),

X is selected from the group consisting of hydrogen, the methyl group $CH_3$, the methylol group $CH_2OH$ and etherified methylol groups, where preferably at least one of the X groups is a methylol group $CH_2OH$ or an etherified methylol group, R is hydrogen or a substituent in the meta or para position to the phenolic hydroxyl group, preferably from the group consisting of methyl, n-butyl, i-butyl, tert-butyl, octyl, nonyl, pentadecenyl, pentadecadienyl and pentadecatrienyl, m is 1 or an integer>1, preferably an integer from 1 to 10, n for each of the m+1 groups (IIIa)

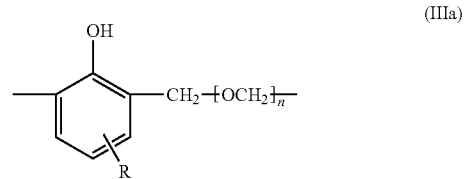

(IIIa)

is independently selected from 0 and 1, where the number of groups (IIIa) with n=1 is greater than the number of groups (IIIa) with n=0, or the number of groups (IIIa) with n=1 is equal to the number of groups (IIIa) with n=0.

The expression "ortho-fused resol" or "ortho-fused phenolic resol", according to the technical understanding of the person skilled in the art, encompasses compounds as disclosed in the textbook "Phenolic Resins: A century of progress" (editor: L. Pilato, publisher: Springer, year of publication: 2010), especially on page 477 by FIG. 18.22. The expression likewise encompasses the "benzyl ether resins (ortho-phenol resols)" specified in VDG Merkblatt [German Society of Foundry Specialists information sheet] R305 "Urethan-Cold-Box-Verfahren" [Urethane Cold Box Process] (February 1998) under 3.1.1. The term additionally encompasses the "phenolic resins of the benzyl ether resin type" disclosed in EP 1 057 554 B1; cf., in particular, paragraphs to therein.

Ortho-fused resols are obtainable by polycondensation of phenol monomers with hydrogen in the ortho position and in the ortho' position in relation to the hydroxyl group with a molar excess of formaldehyde. In addition to phenol monomers with hydrogen in the ortho position and in the ortho' position in relation to the hydroxyl group, o-cresol may be used as a further phenol monomer. Preference is given to reacting formaldehyde and phenol monomers in a molar ratio of greater than 1:1 to 2:1, preferably 1.2:1 to 1.5:1, in the liquid phase, typically at a temperature below 130° C., catalyzed by di-valent metal ions (preferably $Zn^{2+}$) in a weakly acidic medium. The preparation of ortho-fused resols or benzyl ether resins is known in the prior art; cf. EP 1 057 554 B1 inter alia.

The phenolic resin e) is preferably an ortho-fused resol having terminal unetherified methylol groups —$CH_2OH$
and/or
terminal etherified methylol groups —$CH_2OZ$ in which Z is a linear or branched alkyl radical having 1 to 12 carbon atoms,
or an aralkyl radical having 7 to 9 carbon atoms or a furfuryl radical, or
a group having a structure of formula (IV)

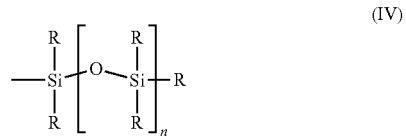

(IV)

where, in formula (IV), n is an integer from 0 to 20, preferably from 0 to 4, and each R, independently of the other R, is selected from the group consisting of hydroxyl groups, alkoxy groups having one to 6 carbon atoms (preferably ethoxy, propoxy or butoxy groups), and groups having a resol structure of formula (IIIb)

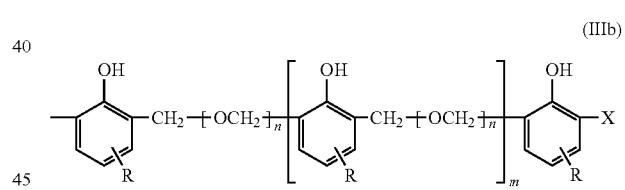

(IIIb)

where, in formula (IIIb),

X is hydrogen or methyl group or a methylol group $CH_2OH$,

R is hydrogen or a substituent in the meta or para position to the phenolic hydroxyl group, preferably from the group consisting of methyl, n-butyl, i-butyl, tert-butyl, octyl, nonyl, pentadecenyl, pentadecadienyl and pentadecatrienyl, m is 1 or an integer>1, preferably an integer from 1 to 10, n for each of the m+1 groups (IIIa)

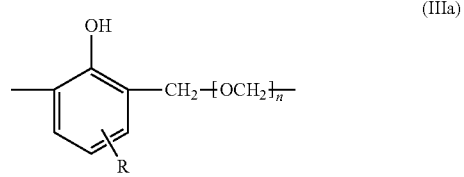

(IIIa)

is independently selected from 0 and 1, where the number of groups (IIIa) with n=1 is greater than the number of groups (IIIa) with n=0, or the number of groups (IIIa) with n=1 is equal to the number of groups (IIIa) with n=0.

Preferably, in formula (IV), only one or none of the R radicals has a resol structure of formula (IIIb) as described above.

In an etherified terminal methylol group as described above, the hydrogen atom bonded to the oxygen atom in the unetherified terminal methylol group —CH$_2$OH is re-placed by a Z radical.

In a first preferred alternative (as specified above), Z is a linear or branched alkyl radical having 1 to 12 carbon atoms, i.e. the —CH$_2$OZ groups are alkoxymethylene groups. Preference is given here to alkyl radicals having 1 to 9 carbon atoms, preferably from the group consisting of methyl, ethyl, n-propyl, i-propyl, n-butyl, i-butyl, tert-butyl and ethylhexyl. Such resins are preparable by reacting the hydroxyl groups of the unetherified terminal methylol groups —CH$_2$OH of an ortho-fused resol with primary, secondary or tertiary alkanols, e.g. methanol, ethanol, n-propanol, i-propanol, n-butanol, i-butanol, tert-butanol and ethylhexyl alcohol.

In a second preferred alternative (as specified above), Z is a linear or branched aralkyl radical (alkyl radical substituted by aryl groups) having 5 to 9 carbon atoms, or a furfuryl radical. Preferred R radicals here are benzyl and furfuryl. Such resins are preparable by reacting the hydroxyl groups of the unetherified terminal methylol groups —CH$_2$OH of an ortho-fused resol with furfuryl alcohol or an aralkyl alcohol, e.g. benzyl alcohol.

In a further preferred alternative, the Z radical of the etherified terminal methylol group of the ortho-fused resol has a structure of formula (IV) as described above. Preferably, in formula (IV), n=0, one of the R radicals has a resol structure of formula (IIIb) and the other radicals are ethoxy groups, or all R radicals in formula (IV) are ethoxy groups. Such resols are preparable by reaction of the unetherified hydroxyl groups (i.e. the hydroxyl groups of the unetherified terminal methylol groups —CH$_2$OH) of an ortho-fused resol with esters of orthosilicic acid. For details, reference is made to patent application WO 2009/130335.

In the phenolic resin e), the ratio of terminal methylol groups CH$_2$OH to etherified terminal methylol groups CH$_2$OZ is preferably greater than 1, more preferably greater than 2, further preferably greater than 4 and especially preferably greater than 10. It will be apparent that this stated ratio relates not to the terminal methylol groups of an individual resol molecule, but to the entirety of the terminal (etherified and unetherified) methylol groups of all resol molecules in the phenolic resin component (i). The resol e) here is a mixture of resol molecules having two etherified terminal methylol groups, resol molecules having one etherified terminal methylol group, resol molecules having one unetherified terminal methylol group, and resol molecules having two unetherified terminal methylol groups, in accordance with the desired ratio.

The solvent f) of the phenolic resin component (i) is preferably selected from the group consisting of
dialkyl esters of C$_4$-C$_6$ dicarboxylic acids (frequently referred to in practice as "dibasic esters"), preferably from the group consisting of dimethyl adipate, dimethyl glutarate, and dimethyl succinate,
saturated and unsaturated fatty acid alkyl esters, preferably vegetable oil alkyl esters, preferably from the group consisting of rapeseed oil methyl ester, tall oil methyl ester, tall oil butyl ester, methyl laurate, isopropyl laurate, isopropyl myristate, and isobutyl myristate,
alkylene carbonates, preferably propylene carbonate,
substances from the group consisting of cashew nut shell oil, components of cashew nut shell oil and derivatives of cashew nut shell oil, preferably cardol, cardanol and also derivatives and oligomers of these compounds,
hydrocarbons that are liquid at 25° C. and 101.325 kPa, preferably from the group consisting of cycloalkanes, alkanes having 6 to 22 carbon atoms and aromatic hydrocarbons, where the aromatic hydrocarbons are preferably selected from the group consisting of alkylbenzenes, alkenylbenzenes, dialkylnaphthalenes, dialkenylnaphthalenes,
compounds from the group of the alkylsilanes, alkyl/alkoxysilanes, alkoxysilanes, alkylsiloxanes, alkyl/alkoxysiloxanes and alkoxysiloxanes of the formula (I)

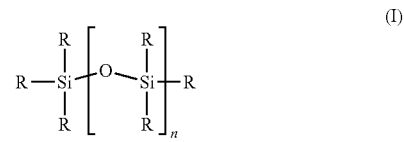

(I)

where n in formula (I) is an integer from 0 to 20, and
each R, independently of the other R, is selected from the group of the alkyl groups having one to 6 carbon atoms and the alkoxy groups having one to 6 carbon atoms, and mixtures thereof.

Compounds of the formula (I) in which n=0 and all R groups are alkyl groups are alkylsilanes. Compounds of the formula (I) in which n=0 and all R groups are alkoxy groups are alkoxysilanes (also referred to as alkyl silicates). Compounds of the formula (I) in which n=0 and one or more R groups are alkyl groups and the rest of the R groups are alkoxy groups are alkyl/alkoxysilanes. Compounds of the formula (I) in which n>0 and all R groups are alkyl groups are alkylsiloxanes. Compounds of the formula (I) in which n>0 and all R groups are alkoxy groups are alkoxysiloxanes. Compounds of the formula (I) in which n>0 and one or more R groups are alkyl groups and the rest of the R groups are alkoxy groups are alkyl/alkoxysiloxanes. Preferred compounds of the formula (I) are alkoxysilanes (alkyl silicates) (i.e., in formula (I), n=0) and alkoxysiloxanes (alkyl silicate oligomers) in which n is an integer from 2 to 5, where the alkoxy groups are preferably ethoxy, propoxy or butoxy groups. Particular preference is given to tetraethyl orthosilicate (TEOS) and ethoxysiloxanes in which n is an integer from 2 to 5.

The expression "hydrocarbons", in accordance with its usual meaning in the field of chemistry, refers to organic compounds consisting solely of carbon and hydrogen.

Particular preference is given to phenolic resin components (i) in which
e) the phenolic resin is selected from the group of the ortho-fused resols as described above, and
f) the solvent is selected from the group of preferred solvents as described above.

In a particularly preferred embodiment of the binder of the invention, the phenolic resin component (i) contains
e) an ortho-fused resol, the molecules of which each have the following structural features:
aromatic rings formed from phenol monomers and linked by methylene ether bridges in the ortho, ortho' position terminal methylol groups —CH$_2$OH and/or terminal alkoxymethylene groups —CH$_2$OZ in which Z is a hydrocarbyl radical having 1 to 12 carbon atoms, at least one aromatic ring composed of 6 carbon atoms per molecule, where a hydroxyl group is bonded to one of the carbon atoms of the aromatic ring and a hydrocarbyl radical is bonded to at least one of the carbon atoms of the aromatic ring, where the hydrocarbyl radical contains 11 to 26 carbon atoms and 0 to 4 double bonds, f) a solvent comprising compounds from the group consisting of hydrocarbons that are liquid at 25° C. and 101.325 kPa, preferably from the group consisting of cycloalkanes, alkanes having 6 to 22 carbon atoms and aromatic hydrocarbons, where the aromatic hydrocarbons are preferably selected from the group consisting of alkylbenzenes, alkenylbenzenes, dialkylnaphthalenes, dialkenylnaphthalenes, alkylsilanes, alkyl/alkoxysilanes, alkoxysilanes, alkylsiloxanes, alkyl/alkoxysiloxanes and alkoxysiloxanes of the formula (I)

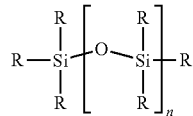

(I)

where n is an integer from 0 to 20, each R, independently of the other R, is selected from the group of the alkyl groups having one to 6 carbon atoms and alkoxy groups having one to 6 carbon atoms, in a concentration of 80% or more, preferably 90% or more, more preferably 95% or more, based on the mass of the solvent f).

For further details, reference should be made to patent application WO 2018/113852 A1.

The phenolic resin component (i) of the binder system of the invention optionally contains further constituents.

The phenolic resin component (i) of the binder system of the invention preferably contains a minimum concentration of g) molecular formaldehyde.

Molecular formaldehyde (often also referred to as "free formaldehyde") is formaldehyde which is not bound within the phenolic resin e) but is present in molecular form. The term "molecular formaldehyde" includes both monomeric formaldehyde and oli-gomeric and polymeric forms, such as paraformaldehyde (mixture of short-chain linear poly(oxymethylene)s composed of 2 or more monomer units) and 1,3,5-trioxane. The concentration of molecular formaldehyde g) is preferably less than 0.1%, more preferably less than 0.08%, especially preferably less than 0.05%, where the concentration is based in each case on the total mass of the phenolic resin component (i).

The concentration of the formaldehyde g) in molecular form in the phenolic resin component (i) can be determined by the KCN method. In this method, the sample to be analyzed is dissolved in a mixture of isopropanol and distilled water in a mixing ratio of isopropanol:H$_2$O=3:1, and molecular formaldehyde present in the sample is converted quantitatively to cyanohydrin by addition of potassium cyanide in excess. The excess of potassium cyanide is subsequently back-titrated with mercury(II) nitrate solution and diphenylcarbazone as indicator.

The KCN method is preferably conducted according to the detailed description that follows. The following solutions are required here:

| | |
|---|---|
| IPA/water | Mixture of iso-propanol (IPA) (purity level: p.A.) and distilled water Mixing ratio of iso-propanol:H$_2$O = 3:1 |
| KCN solution | Aqueous KCN solution KCN concentration: 0.1 mol/L |
| Phosphate buffer solution: | Preparation: Make up an initial charge of 348 g of K$_2$HPO$_4$ and 136 g of KH$_2$PO$_4$ in a 1 L standard flask to 1 L with deionized water and mix until a clear solution is obtained. |
| Borate buffer solution: | Preparation: Make up an initial charge of 76.4 g of K$_2$B$_4$O$_7$x2H$_2$O (purity level: p.A.) in a 1 L standard flask to 1 L with deionized water and mix until a clear solution is obtained. |
| Hg(NO$_3$)$_2$ solution: | Aqueous Hg(NO$_3$)$_2$ solution, Hg(NO$_3$)$_2$ concentration: 0.05 mol/L |
| Indicator solution: | Solution of diphenylcarbazone in methanol, Diphenylcarbazone concentration: 1% by weight |

A blank value must be determined before each measurement. For this purpose, a 400 ml beaker is initially charged with 100 ml of "IPA/water". The mixture is mixed with a magnetic stirrer, and first 40 mL of borate buffer solution and then 20 mL of KCN solution are added. After two minutes, 5 mL of phosphate buffer solution and 3 to 5 drops of indicator solution are added, such that coloring of the solution is observed. Titration is effected with a 0.05 molar aqueous Hg(NO$_3$)$_2$ solution. The endpoint of the titration is apparent from the color change to violet. The color should be stable for at least 10 seconds after attainment of the endpoint. The consumption of 0.05 M Hg(NO$_3$)$_2$ solution is noted as the "blank value".

In the performance of the formaldehyde determination, it should be ensured that the sample weight is adjusted in accordance with the expected formaldehyde content, and is preferably chosen such that about 10 to 20 mL of 0.05 molar Hg(NO$_3$)$_2$ solution is needed for the titration. The following table gives guide values for the sample weight to be chosen:

| Expected formaldehyde content [%] | Sample weight [g] |
|---|---|
| <0.05% | 10 to 40 g |
| 0.05 to 0.5% | 3 to 10 g |
| 0.5 to 1.0% | 2 to 3 g |

The sample is weighed out with the aid of an analytical balance in a 400 ml beaker and dissolved in 100 ml of "IPA/water". The mixture is mixed with a magnetic stirrer, and first 40 mL of borate buffer solution and then 20 mL of KCN solution are added. The pH of the solution should be in the region of 9.3. At the end of a reaction time of two minutes (measured from the moment of addition of the KCN solution), 5 mL of phosphate buffer solution and 3 to 5 drops of indicator solution are added, such that coloring of the solution is observed. Titration is effected with a 0.05 molar aqueous Hg(NO$_3$)$_2$ solution. The endpoint of the titration is apparent from the color change to violet. The color should be stable for at least 10 seconds after attainment of the endpoint. The consumption of 0.05 M Hg(NO$_3$)$_2$ solution is noted as the "consumed value".

The concentration of molecular formaldehyde g) in [% by weight] is calculated by the following formula:

Molecular formaldehyde [% by weight]=(blank value [$ml$]−consumed value [$ml$])×0.294 [$g/ml$] sample weight [$g$]

The concentration of molecular formaldehyde g) in the phenolic resin component (i) can be determined in similar accuracy by means of HPLC; preference is generally given to determination by means of HPLC.

In the preparation of the above-described preferred phenolic resins e) (ortho-fused resols), as described above, phenol monomers are reacted with a relatively high molar excess of formaldehyde, such that high residual amounts of molecular formaldehyde g) are inevitably present alongside the resol e) obtained as the product.

Especially in such cases, it is preferable that one or more β-dicarbonyl compounds that react with the molecular formaldehyde g) are added to the phenolic resin component (i) of the binder system of the invention. With regard to the selection of preferred β-dicarbonyl compounds and the products formed by their reaction with molecular formaldehyde g), the same applies as for the β-dicarbonyl compounds present in the isocyanate composition of the invention.

By reaction with β-dicarbonyl compound(s), molecular formaldehyde in the phenolic resin component (i) is bound to form nonvolatile reaction products, such that the concentration of molecular formaldehyde in the phenolic resin component (i) is reduced. Thus, in binder systems that are particularly preferred in accordance with the invention, the phenolic resin component (i) contains h) reaction products formed by reaction of one or more β-dicarbonyl compounds with formaldehyde.

For details, reference is made to WO 2016/165916 A1.

By addition of β-dicarbonyl compounds to the phenolic resin component (i) as described in WO 2016/165916 A1, it is possible to reduce the concentration of molecular formaldehyde g) in the phenolic resin component (i) of the binder system of the invention. The use of a phenolic resin component (i) having a low concentration of molecular formaldehyde g) ensures that as little molecular formaldehyde g) as possible is introduced into a molding material mixture containing the binder system of the invention and moldings produced therefrom. This contributes to reducing the emission of formaldehyde in the processing of the molding material mixture and moldings produced therefrom in its use.

But even if the phenolic resin component (i) of the binder system contains only a small concentration of molecular formaldehyde g), it is unavoidable that moldings produced with this binder system will release formaldehyde over the course of time, especially under thermal stress. This is bound by reaction with β-dicarbonyl compound(s) present in accordance with the invention in the polyisocyanate component (ii) of the binder system of the invention to form nonvolatile reaction products, such that the emission of formaldehyde is reduced.

It is preferable in accordance with the invention that both the polyisocyanate component (ii) and the phenolic resin component (i) of the binder system of the invention contain β-dicarbonyl compounds capable of reacting with formaldehyde to form nonvolatile compounds, such that the emission of formaldehyde is reduced.

In the production of the phenolic resin component (i), preference is therefore given to adding one or more β-dicarbonyl compounds in a molar excess relative to the total amount of molecular formaldehyde g). For details, reference is made to WO 2016/165916 A1. Thus, in binder systems that are particularly preferred in accordance with the invention, the phenolic resin component (i) contains h) one or more β-dicarbonyl compounds and reaction products formed by reaction of these β-dicarbonyl compounds with formaldehyde, where the total concentration of unreacted β-dicarbonyl compounds and those bound in reaction products with formaldehyde is preferably 0.1% to 14%, preferably 0.6% to 5%, where the concentration is based in each case on the total mass of the phenolic resin component (i).

Preferably, the β-dicarbonyl compounds h) present in the phenolic resin component (i) of a binder system of the invention and the β-dicarbonyl compounds present in the polyisocyanate component (ii) of this binder system are selected from the group of the dialkyl esters of malonic acid (dialkyl malonates), where the alkyl groups are independently selected from alkyl groups having 1 to 4 carbon atoms. Particular preference is given to diethyl malonate and dimethyl malonate. More preferably, the β-dicarbonyl compounds present in the phenolic resin component (i) of a binder system of the invention are identical to the β-dicarbonyl compounds present in the polyisocyanate component (ii) of this binder system.

The phenolic resin component (i) of the binder system of the invention preferably contains a minimum concentration of i) monomeric compounds from the group of the phenols.

Monomeric compounds from the group of the phenols are phenol monomers that are not bound within the phenolic resin e) but in monomeric form. When the phenolic resin composition (i) contains monomeric compounds i) from the group of the phenols, these are usually residual amounts of phenol monomers unconverted in the phenolic resin preparation. Therefore, any monomeric compounds i) present in a phenolic resin composition (i) from the group of the phenols are typically identical to those phenol monomers bound by methylene bridges or methylene ether bridges within the phenolic resin e) of this phenolic resin composition (i).

Preferably, the concentration of monomeric compounds from the group of the phenols i) is 10% or less, preferably 5% or less, more preferably 1% or less, where the concentration is based in each case on the total mass of the phenolic resin component (i).

When the phenolic resin component (i) of the binder system of the invention contains a resol as phenolic resin e), the phenolic resin component then usually also contains j) one or more compounds from the group of the hydroxybenzyl alcohols.

Compounds from the group of the hydroxybenzyl alcohols j) are especially saligenin (2-hydroxybenzyl alcohol, o-hydroxybenzyl alcohol) and homosaligenin (4-hydroxybenzyl alcohol, p-hydroxybenzyl alcohol). In the preparation of phenolic resins, these form by addition of one molecule of formaldehyde onto one molecule of phenol (hydroxybenzene). For details, reference is made to DE 10 2016 125 700 A1.

Preferably, in the phenolic resin component (i) of the binder system of the invention, the concentration of compounds from the group of the hydroxybenzyl alcohols j) is higher than the concentration of monomeric phenol (monomeric hydroxybenzene). Preferably, the mass ratio of the compounds j) from the group of the hydroxybenzyl alcohols to monomeric phenol (hydroxybenzene) is not less than 1.2, preferably 1.2 to 1:30, and/or the mass ratio of saligenin to phenol (hydroxybenzene) is not less than 1.1, preferably 1.1 to 25, where the concentration of monomeric phenol is preferably less than 2.5% in each case, more preferably less than 2%, where the concentrations are each based on the total mass of the phenolic resin component (i).

Added to the phenolic resin component (i) of the binder system of the invention in some cases are
k) one or more silanes.

In some cases, the phenolic resin component (i) of the binder system of the invention contains
l) hydrofluoric acid.

Hydrofluoric acid results in improved moisture resistance of the foundry molds and foundry cores, especially when hydrofluoric acid is used together with silanes k).

Particular preference is given to binder systems wherein the phenolic resin component (i) contains
e) an ortho-fused resol of formula (III) as described above
f) a solvent selected from the group of preferred solvents as described above
h) one or more β-dicarbonyl compounds, and reaction products formed by reacting these β-dicarbonyl compounds with formaldehyde.

In a preferred embodiment of the binder system of the invention, one or both of components (i) and (ii) further comprise(s)
m) one or more silicone surfactants comprising at least one structural unit —Si($C_nH_{2n+1}$)$_2$—O— per molecule, where n is an integer from 1 to 3, and at least one polyalkoxy group, where the concentration of the silicone surfactants m) is preferably 0.001% to 1.0%, more preferably from 0.001% to 0.8% and especially preferably from 0.002% to 0.5%, based on the sum total of the mass of component (i) and the mass of component (ii). With regard to preferred silicone surfactants, reference is made to EP 3 333 205 A1. Irrespective of whether the phenolic resin component (i) only or the polyisocyanate component (ii) only or both components (i) and (ii) comprise(s) silicone surfactants m), the concentration of the silicone surfactants m) is preferably 0.001% to 1.0%, further preferably 0.001% to 8% and especially preferably from 0.002% to 0.5%, based on the sum total of the masses of component (i) and component (ii).

A third aspect of the present invention relates to a process comprising the steps of:
producing a molding material mixture by mixing the phenolic resin component (i) and the polyisocyanate component (ii) of a binder system according to the second aspect of the invention as described above with a molding material base and optionally further constituents of the molding material mixture to be prepared, so as to form a molding material mixture comprising the phenolic resin component (i) and the polyisocyanate component (ii) of a binder system according to the second aspect of the invention as described above and a molding material base,
molding the molding material mixture,
curing the binder system in the molded molding material mixture to form a molding.

In the process of the invention, the molding formed by curing the binder system in the molded molding material mixture may be subjected to further processing with supply of heat, or the process of the invention may include a further processing step comprising a thermal treatment of the molding formed by curing the binder system in the molded molding material mixture.

The molding material mixture to be produced in the process of the invention comprises
components (i) and (ii) of a binder system according to the above-described second aspect of the present invention and a molding material base
and optionally further constituents, where the total concentration of components (i) and (ii) of the binder system according to the above-described second aspect of the present invention is typically 0.6% to 14%, based on the total mass of the molding material mixture.

In molding material mixtures for the production of foundry cores or foundry molds, the total concentration of components (i) and (ii) of the binder system in the above-described second aspect of the present invention is typically 0.6% to 3%, preferably 0.8% to 2%, more preferably 1.0% to 1.6%, based on the total mass of the molding material mixture.

In molding material mixtures for the production of feeders, the total concentration of components (i) and (ii) of the binder system in the above-described second aspect of the present invention is typically 8% to 14%, preferably 10% to 12%, based on the total mass of the molding material mixture.

In the molding material mixture to be produced in the process of the invention, the stoichiometric ratio of isocyanate groups in the polyisocyanate component (ii) to hydroxyl groups in the phenolic resin component (i) is preferably in the range from 0.5 to 1.5, further preferably in the range from 0.6 to 1.4, more preferably in the range from 0.7 to 1.3, particularly preferably in the range from 0.8 to 1.2, very particularly preferably in the range from 0.9 to 1.1, especially preferably in the range from 0.95 to 1.05. While it is preferable in many cases that the stoichiometric ratio of isocyanate groups in the polyisocyanate component (ii) to hydroxyl groups in the phenolic resin component (i) is close to 1, there are also cases in which it is advantageous that there is an excess of isocyanate groups relative to the hydroxyl groups, and also cases in which it is advantageous that there is an excess of hydroxyl groups relative to isocyanate groups.

The term "molding material base" includes both individual materials suitable as molding material base and mixtures of different materials suitable as molding material base.

Suitable molding material bases are all molding material bases that are typically used for the production of feeders, foundry molds and foundry cores, for example quartz sand and specialty sands. The term "specialty sand" includes natural mineral sands, and sintering and melting products that are produced in grain form or are converted to grain form by crushing, grinding and classifying operations, or inorganic mineral sands that have formed through other physicochemical processes and are used as molding material bases with standard binders for foundry purposes for the manufacture of feeders, cores and molds. Specialty sands include
aluminum silicates in the form of natural minerals or mineral mixtures such as J Sand and Kerphalite KF,
aluminum silicates in the form of industrial sintered ceramic, for example fireclay and Cerabeads,
natural heavy minerals such as R Sand, chromite sand and zircon sand,
industrial oxide ceramic such as M Sand and bauxite sand, and industrial non-oxide ceramic such as silicon carbide.

Molding material mixtures for the production of feeders are also referred to as feeder compounds. A feeder compound of the invention comprises, as well as components (i)

and (ii) of a binder system according to the above-described second aspect of the present invention and a molding material base, typically insulating fillers such as hollow microbeads, optionally fiber material, and, in the case of exothermic feeders, an oxidizable metal and an oxidizing agent for the oxidizable metal. The production of feeders by the polyurethane cold-box method and materials suitable as feeder constituents are known to the person skilled in the art; see, for example, WO 2008/113765 and DE 10 2012 200 967.

If the phenolic resin component (i) introduced into the molding material mixture contains molecular formaldehyde g), this reacts with the β-dicarbonyl compound(s) b) introduced by the polyisocyanate component (ii) of the binder system of the invention to give nonvolatile reaction products, such that emissions of molecular formaldehyde g) from the molding material mixture are reduced.

Since it cannot be ruled out that the molding produced from the molding material mixture in the process of the invention, in the course of further processing or use thereof, will release further molecular formaldehyde, it is advantageous when the molding material mixture produced in the process of the invention, as well as the reaction products formed by reaction of the β-dicarbonyl compounds b) with molecular formaldehyde g) from the phenolic resin component (i), also contains unreacted β-dicarbonyl compounds b). For this purpose, the concentration of the β-dicarbonyl compounds b) introduced into the molding material mixture with the polyisocyanate component (ii) is adjusted such that there is a molar excess relative to the amount of molecular formaldehyde g) introduced into the molding material mixture with the phenolic resin component (i). With regard to preferred β-dicarbonyl compounds b), the above remarks relating to the first aspect of the present invention are applicable.

The molding of the molding material mixture is typically effected by filling, blowing or shooting the molding material mixture into a mold and then optionally compacting.

The binder system in the molded molding material mixture is preferably cured without supply of heat. For this purpose, for curing of the binder system, the molded molding material mixture is contacted with a gaseous tertiary amine or with a mixture of two or more gaseous tertiary amines or with a liquid tertiary amine or with a mixture of two or more liquid tertiary amines.

The curing of a binder comprising a phenolic resin component (i) and a polyisocyanate component (ii) in the presence of a gaseous tertiary amine or a mixture of two or more gaseous tertiary amines is known in the prior art as the polyurethane cold-box process, and the curing of a binder comprising a phenolic resin component (i) and a polyisocyanate component (ii) in the presence of a liquid tertiary amine or a mixture of two or more liquid tertiary amines as the polyurethane no-bake process.

The tertiary amine is preferably selected from the group consisting of triethylamine, dimethylethylamine, diethylmethylamine, dimethylisopropylamine, dimethylpropylamine and mixtures thereof. The tertiary amines to be used are liquid at room temperature and are evaporated by supply of heat for use in the polyurethane cold-box process, and the evaporated tertiary amine—optionally by means of a carrier gas stream—is sprayed or injected into the mold.

In principle, it is also possible to cure the binder system of the invention by supplying heat. Corresponding technologies are known to the person skilled in the art (e.g. the hot-box process). However, curing of the binder system with supply of heat is not preferred in accordance with the invention.

The molding produced in the process of the invention contains a molding material base bound by a polyurethane that has been formed by curing a binder system according to the second aspect of the present invention. The molding produced in the process of the invention further comprises one or more β-dicarbonyl compounds b) and/or reaction products formed by reaction of these β-dicarbonyl compounds b) with formaldehyde. Such reaction products are formed in the process of the invention firstly when molecular formaldehyde g) is introduced by the phenolic resin component (i) in the course of production of the molding material mixture, and secondly especially when the binder system in the molded molding material mixture is cured with supply of heat (although this is not preferred in accordance with the invention) and when the molding formed by curing of the binder system in the molded molding material mixture is subjected to further processing with supply of heat (for details see below). It is therefore preferable that the molding formed by curing the binder system contains not only any reaction products formed by reaction of the β-dicarbonyl compounds b) with molecular formaldehyde g) from the phenolic resin component (i) but also unreacted 3-dicarbonyl compounds b) that bind formaldehyde formed in the course of further processing of the molding by formation of nonvolatile reaction products, such that the emission of formaldehyde from the molding is reduced. With regard to preferred β-dicarbonyl compounds b), the above remarks relating to the first aspect of the present invention are applicable.

In a first version of the process of the invention, the molding formed by curing of the binder system in the molded molding material mixture is an article from the group consisting of feeders, foundry molds and foundry cores; in other words, the molding obtained by the process of the invention is usable as foundry core, as foundry mold or as feeder without further processing steps. Foundry cores, foundry molds and feeders, and their configuration, manner of function and use, are known to the person skilled in the art.

In a second variant of the process of the invention, multiple moldings are formed and combined to form an article from the group consisting of foundry molds and foundry cores or combinations of a foundry mold with one core or with multiple cores. Such articles composed of multiple moldings are also referred to as core packages. Such combined foundry molds and foundry cores or combinations of a foundry mold with one or more cores are especially required for production of castings having complex geometry. For this purpose, the moldings to be combined with one another are in-serted into one another, and in special cases also bonded to or screwed into one another.

In a further version of the process of the invention, the molding formed by curing the binder system in the molded molding material mixture is subjected to further processing steps in order to form a foundry core, a foundry mold or a feeder, wherein the foundry core, a foundry mold or a feeder comprises the molding formed by curing the binder system in the molded molding material mixture.

In a preferred first specific variant of the process of the invention, the further processing step involves providing a molding formed by curing the binder system in the molded molding material mixture with a coating. In this first specific variant, the process of the invention comprises the further steps of applying a coating composition comprising particles of one or more refractories dispersed in a carrier fluid to the molding, forming a coated molding, the surface of which has regions provided with the coating composition, subjecting the coated molding to thermal treatment at a temperature above 40° C., preferably in the range from 50° C. to 200° C., forming an article from the group consisting of foundry molds and foundry cores, the surface of which has regions in which a coating comprising particles of one or more refractories is disposed.

Coating compositions comprising particles of one or more refractories dispersed in a carrier liquid are also referred to as slip compositions. Such slip compositions are known in the prior art and are described, for example, in patent application WO 2011/003637 A1. The coatings formed therefrom are also referred to as coatings on the basis of a refractory coating or refractory coatings.

In accordance with the typical understanding of the person skilled in the art (cf. DIN 51060:2000-06), "refractory" masses, materials and minerals refer to those that can at least briefly withstand the thermal stress in the course of casting or solidifying of an iron melt, usually cast iron. "Highly refractory" masses, materials and minerals refer to those that can briefly withstand the heat of casting of a steel melt. The temperatures that can occur in the casting of steel melts are usually higher than the temperatures that can occur in the casting of iron or cast iron melts. Refractory masses, materials and minerals (refractories) and highly refractory masses, materials and minerals are known to the person skilled in the art, for example from DIN 51060:2000-06. Unless stated otherwise, pulverulent refractories in that case have an average grain size (preferably measured by means of light scattering to ISO 13320:2009-10) in the range from 0.1 μm to 500 μm, preferably in the range from 1 μm to 200 μm. Suitable refractories are especially those materials that have melting points at least 200° C. above the temperature of the metal melt used in each case and/or do not enter into any reactions with the metal melt. The term "refractory" as used here also includes highly refractory substances.

The refractories are selected from those refractories that are typically used in refractory coatings, for example refractories selected from the group consisting of quartz, aluminum oxide, zirconium dioxide, aluminum silicates, non-swellable sheet silicates, zirconium silicates, olivine, talc, mica, graphite, coke, feldspar, diatomite, kaolins, cal-cined kaolins, metakaolinite, iron oxide and bauxite.

Compositions for production of coatings on the basis of a refractory coating frequently contain further constituents such as wetting agents, rheology additives, binders, suspension aids and/or biocides. Suitable wetting agents, rheology additives, binders, suspension aids and biocides and their function and effect are known to the person skilled in the art.

The carrier liquid serves merely as a vehicle for applying the substances suspended and dissolved therein to the molding, and is removed by subjecting the coated molding to thermal treatment. The carrier liquid is in liquid form under standard conditions (25° C. and 1013.25 hPa), and is evaporable under standard pressure (1013.25 hPa) at temperatures above 40° C., preferably in the range from 50° C. to 200° C. The carrier liquid is preferably selected from the group consisting of water, methanol, ethanol and isopropanol.

The coating composition is typically applied to the molding by a method selected from the group consisting of spraying, dipping, flow coating and painting, preferably dipping. The thermal treatment of the coated molding at a temperature above 40° C., preferably in the range from 50° C. to 200° C., removes the carrier liquid from the coating composition applied. The resultant coating comprising particles of one or more refractories forms a surface of the foundry mold or foundry core that comes into contact with a metal melt in the casting operation.

Thermal stress on the molding formed by curing the binder system in the molded molding material mixture frequently gives rise to molecular formaldehyde. If the molding formed by curing the binder system in the molded molding material mixture, in the process of the invention, is to be subjected to a further processing step comprising a thermal treatment as, for example, in the above-described first specific variant of the process of the invention, it is preferable that the molding formed by curing the binder system in the molded molding material mixture comprises one or more β-dicarbonyl compounds b) that bind formaldehyde formed in the course of further processing thereof by forming nonvolatile reaction products, such that the emission of formaldehyde is reduced.

Particular preference is given to using, in the above-described first specific variant of the process of the invention, a coating composition comprising particles of one or more refractories dispersed in a carrier liquid and one or more compounds capable of forming nonvolatile compounds by reaction with formaldehyde, such that the emission of formaldehyde in the course of thermal treatment for removal of the carrier liquid in the coating composition is reduced further. Such coating compositions, and their production, use and effect, are described in patent application DE 10 2018 118 291.0, which was yet to be published at the priority date of the present application, of the applicant of the present patent application.

Particular preference is given to using, in the above-described first specific variant of the process of the invention, a coating composition comprising one or more formaldehyde scavengers from the group consisting of β-dicarbonyl compounds
di- and trihydric phenols
phenol-formaldehyde novolaks and resorcinol-formaldehyde novolaks
amino acids
primary and secondary aminosilanes
alkali metal hydrogensulfites
melamine, benzoguanamine, urea and derivatives thereof
hydrazine and carbonohydrazide and derivatives thereof
primary and secondary amines
tree resins, tannins and lignins.

Formaldehyde formed in the thermal treatment of the coated molding is bound by the formaldehyde scavengers present in the coating composition applied to form nonvolatile reaction products, such that the coating formed from the coating composition contains reaction products formed by reaction of the formaldehyde scavenger present in the coating composition with formaldehyde.

In order to enable the greatest possible reduction in the emission of formaldehyde, it is preferable in accordance with the invention that, in the process of the invention, the molding material mixture is produced using a binder system of the invention, the phenolic resin component (ii) of which contains g) molecular formaldehyde in a concentration of less than 0.1%, further preferably less than 0.08%, especially preferably less than 0.05%, h) and one or more β-dicarbonyl compounds,
where the concentration is each based on the total mass of the phenolic resin component (i),
and
the concentration of the β-dicarbonyl compounds b) introduced into the molding material mixture with the polyisocyanate component (ii) is adjusted such that there is a molar excess relative to the amount of molecular formaldehyde g) introduced into the molding material mixture with the phenolic resin component (i) and
the coating is produced using a coating composition comprising one or more compounds capable of forming nonvolatile compounds by reaction with formaldehyde.

A preferred second specific variant of the process of the invention comprises the steps of
producing a molding material mixture by mixing the phenolic resin component (i) and the polyisocyanate component (ii) of a binder system according to the second aspect of the invention as described above with a molding material base and optionally further constituents of the molding material mixture to be prepared, so as to form a molding material mixture comprising the phenolic resin component (i) and the polyisocyanate component (ii) of a binder system according to the second aspect of the invention as described above and a molding material base,
producing a molding by molding the molding material mixture and curing the binder system in the molded molding material mixture,
applying a coating composition comprising particles of one or more refractories dispersed in a carrier fluid to the molding, forming a coated molding, the surface of which has regions provided with the coating composition,
combining the coated molding with one or more further moldings that have been produced by molding the abovementioned molding material mixture or another molding material mixture and curing the binder system in the molded molding material mixture to give a combined molding,
subjecting the combined molding to thermal treatment at a temperature above 40° ° C., preferably in the range from 50° C. to 200° C., to obtain an article from the group consisting of foundry molds and foundry cores and combinations of a foundry mold with cores, the surface of which has regions in which a coating comprising particles of one or more refractories is disposed.

In this second specific variant of the process of the invention, multiple moldings are produced, these being intended for combination to form an article from the group consisting of foundry molds and foundry cores or combinations of a foundry mold with one core or with multiple cores. At least one of these moldings is produced by molding a molding material mixture comprising components (i) and (ii) of a binder system according to the above-described second aspect of the present invention, and curing the binder system in the molded molding material mixture. A coating composition comprising particles of one or more refractories dispersed in a carrier fluid is applied to this molding, forming a coated molding, the surface of which has regions provided with the coating composition. The same molding material mixture or a different molding material mixture is used for the production of the further moldings. This other molding material mixture may comprise a noninventive binder system. A coating composition comprising particles of one or more refractories dispersed in a carrier fluid may be applied to one, more than one or all further moldings, forming a coated molding, the surface of which has regions provided with the coating composition. Subsequently, the moldings produced, at least one of which is a coated molding produced from a molding material mixture comprising a binder system of the invention, are joined to form a combined molding.

The thermal treatment of the combined molding at a temperature above 40° C., preferably in the range from 50° C. to 200° C., removes the carrier liquid from the coating composition applied. The resultant coating comprising particles of one or more refractories forms a surface of the foundry mold or foundry core that comes into contact with a metal melt in the casting operation.

Preference is given to using, in this second specific variant of the process of the invention too, a coating composition as described above in the context of the first specific variant of the process of the invention, comprising particles of one or more refractories dispersed in a carrier liquid and one or more compounds capable of forming nonvolatile compounds by reaction with formaldehyde, such that the emission of formaldehyde in the course of thermal treatment for removal of the carrier liquid in the coating composition is reduced further.

In this second specific variant of the process of the invention, it is particularly preferable that all moldings to be combined are produced by molding a molding material mixture comprising components (i) and (ii) of a binder system according to the above-described second aspect of the present invention and curing the binder system in the molded molding material mixture. A process according to the second specific variant of the process of the invention therefore preferably comprises the steps of
producing a molding material mixture by mixing the phenolic resin component (i) and the polyisocyanate component (ii) of a binder system according to the second aspect of the invention as described above with a molding material base and optionally further constituents of the molding material mixture to be prepared, so as to form a molding material mixture comprising the phenolic resin component (i) and the polyisocyanate component (ii) of a binder system according to the second aspect of the invention as described above and a molding material base,
producing two or more moldings, each by molding the molding material mixture and curing the binder system of the molded molding material mixture,
applying a coating composition comprising particles of one or more refractories dispersed in a carrier fluid to the one, more than one or all moldings, forming coated moldings, the surfaces of which have regions provided with the coating composition,
combining the moldings, where one, more than one all moldings are coated moldings, to give a combined molding,
subjecting the combined molding to thermal treatment at a temperature above 40° C., preferably in the range from 50° C. to 200° C., to obtain an article from the group consisting of foundry molds and foundry cores and combinations of a foundry mold with cores, the surface of which has regions in which a coating comprising particles of one or more refractories is disposed.

A fourth aspect of the present invention relates to articles from the group consisting of foundry molds and foundry cores. Such articles are producible by a process according to the above-described preferred first or second specific variant of the process of the invention.

In a first embodiment, an article of the invention comprises a shaped body comprising a molding material base bound by a polyurethane formed by curing a binder system according to the above-described second aspect of the invention, and one or more reaction products formed by reacting β-dicarbonyl compounds b) with formaldehyde, wherein the surface of the article has regions in which the coating comprising particles of one or more refractories is disposed.

In this first embodiment, an article of the invention comprises a molding comprising a molding material base bound by a polyurethane formed by curing of a binder system according to the above-described second aspect of the invention, and one or more reaction products formed by reacting β-dicarbonyl compounds b) with formaldehyde. The surface of the article has regions in which a coating comprising particles of one or more refractories is disposed. The coating forms the surface of the foundry mold or foundry core that comes into contact with a metal melt in the casting operation. There is no need here for the coating to extend over the entire surface of the article. Such coatings are typically referred to as refractory coatings.

Inventive articles in this first embodiment are producible by a process of the invention according to the above-described first specific variant.

In a second embodiment, an article of the invention comprises multiple moldings joined to one another, wherein at least one of the moldings joined comprises a molding material base bound by a polyurethane formed by curing a binder system according to the above-described second aspect of the invention, and one or more reaction products formed by reacting β-dicarbonyl compounds b) with formaldehyde, wherein the surface of the article has regions in which a coating comprising particles of one or more refractories is disposed.

In this second embodiment, an article of the invention comprises multiple moldings joined to one another. At least one of the moldings joined comprises a molding material base bound by a polyurethane formed by curing of a binder system according to the above-described second aspect of the invention, and one or more reaction products formed by reacting β-dicarbonyl compounds b) with formaldehyde. Preferably, all the moldings joined comprise a molding material base bound by a polyurethane formed by curing of a binder system according to the above-described second aspect of the invention, and one or more reaction products formed by reacting β-dicarbonyl compounds b) with formaldehyde.

The surface of the article has regions in which a coating comprising particles of one or more refractories is disposed. The coating forms the surface of the foundry mold or foundry core that comes into contact with a metal melt in the casting operation. There is no need here for the coating to extend over the entire surface of the article. Such coatings are typically referred to as refractory coatings.

Inventive articles in this second embodiment are producible by a process of the invention according to the above-described second specific variant.

In particularly preferred articles of the invention, the coating comprises reaction products formed by reaction of formaldehyde with one or more compounds selected from the group consisting of β-dicarbonyl compounds di- and trihydric phenols phenol-formaldehyde novolaks and resorcinol-formaldehyde novolaks amino acids primary and secondary aminosilanes alkali metal hydrogensulfites melamine, benzoguanamine, urea and derivatives thereof hydrazine and carbonohydrazide and derivatives thereof primary and secondary amines tree resins, tannins and lignins;

in other words, in such a particularly preferred article, the coating contains the reaction products formed by reaction of formaldehyde scavengers present in the coating composition with formaldehyde formed in the course of thermal treatment of the coated molding.

Further aspects of the present invention relate to the use of β-dicarbonyl compounds for preparation of isocyanate compositions according to the above-described first aspect of the invention the use of an isocyanate composition according to the above-described first aspect of the invention for production of binder systems according to the above-described second aspect of the invention the use of a binder system according to the above-described second aspect of the invention for production of articles from the group consisting of foundry molds, foundry cores and feeders the use of a binder system according to the above-described second aspect of the invention in a process according to the above-described third aspect of the invention, wherein, in the inventive, the molding formed by curing the binder system in the molded molding material mixture can be subjected to further processing with supply of heat, or wherein the process of the invention may comprise a further processing step comprising a thermal treatment of the molding formed by curing the binder system in the molded molding material mixture.

With regard to preferred β-dicarbonyl compounds, the above remarks relating to the first aspect of the present invention are applicable.

With regard to preferred features and embodiments of the isocyanate composition, the above remarks relating to the first aspect of the present invention are applicable.

With regard to preferred features and embodiments of the binder system, the above remarks relating to the second aspect of the present invention are applicable.

With regard to preferred features, versions and variants of the process, the above remarks relating to the third aspect of the present invention are applicable.

The invention is elucidated in detail hereinafter with reference to working examples and comparative examples.

1. Production and Testing of Test Specimens in the Form of Flexural Bars 1.1 Composition of the Binder Systems The figures in % by weight are respectively based on the total mass of the phenolic resin component (i) or of the polyisocyanate component (ii).

Binder System I
Phenolic Resin Component (i):
  Phenolic resin e) ortho, ortho'-fused resol with terminal methylol groups —CH$_2$OH and methanol-etherified terminal methylol groups —CH$_2$OCH$_3$, 54% by weight
  Solvent f) mixture of tetraethyl silicate and dialkyl esters of C$_4$-C$_6$ dicarboxylic acids
Isocyanate Component (ii)
  Isocyanate: a) polymeric MDI, 85% by weight
  Solvent c) mixture of rapeseed oil methyl ester and propylene carbonate In a first noninventive variant of the binder system I, neither component (i) nor component (ii) contains a β-dicarbonyl compound. In a second noninventive variant of the binder system I, component (i) contains diethyl malonate as β-dicarbonyl compound h), where the total concentration of unreacted diethyl malonate and that bound in reaction products with formaldehyde is 6% by weight, and component (ii) does not contain any β-dicarbonyl compound.

In a first inventive variant of the binder system I, component (i) does not contain any β-dicarbonyl compound and component (ii) contains 5% by weight of diethyl malonate as β-dicarbonyl compound b). In a second inventive variant of the binder system I, component (i) contains diethyl malonate as β-dicarbonyl compound h), where the total concentration of unreacted diethyl malonate and that bound in reaction products with formaldehyde is 1% by weight, and component (ii) contains 5% by weight of diethyl malonate as β-dicarbonyl compound b).

Binder System II
Phenolic Resin Component (i):
  Phenolic resin e) ortho, ortho'-fused resol with terminal methylol groups —CH$_2$OH and methanol-etherified terminal methylol groups —CH$_2$OCH$_3$, 54.5% by weight
  Solvent f) mixture of dialkyl esters of C$_4$-C$_6$ dicarboxylic acids and rapeseed oil methyl ester
Isocyanate Component (ii)
  Isocyanate: a) polymeric MDI, 85% by weight
  Solvent c) rapeseed oil methyl ester In a noninventive variant of the binder system II, neither component (i) nor component (ii) contains a β-dicarbonyl compound.

In an inventive variant of the binder system II, component (i) contains diethyl malonate as β-dicarbonyl compound h), where the total concentration of unreacted diethyl malonate and that bound in reaction products with formaldehyde is 1% by weight, and component (ii) contains 3% by weight of diethyl malonate as β-dicarbonyl compound b).

1.2 Production of Test Specimens (Cold-Box Method)

Molding material mixtures comprising H32 quartz sand as molding material base and one (inventive or noninventive) variant in each case of one of the binder systems I and II described in point 1.1 were used to produce test specimens in the form of flexural bars by the cold-box method.

For production of the molding material mixture, the molding material base (100 parts by weight) was initially charged in a mixing vessel. The phenolic resin component (i) (0.7 part by weight) and the polyisocyanate component (ii) (0.7 part by weight) of the respective binder system were then weighed into the mixing vessel in such a way that they do not mix directly. Subsequently, molding material base, phenolic resin component (i) and polyisocyanate component (ii) were mixed in a bull mixer for 120 seconds at level 4 to give a molding material mixture.

The molding material mixture was molded by means of a Multiserw core shooting machine at a shooting pressure of 4 bar (400 kPa). For curing of the binder system in the molded molding material mixture, sparging with dimethylpropylamine (in a carrier gas stream) at a temperature in the range from 20 to 30° C. was effected at a sparging pressure of 2 bar (200 kPa) by means of a Titronic 110 Plus sparging device.

1.3 Measurement of Formaldehyde Emissions on Thermal Treatment

Selected test specimens without coating on the basis of a refractory coating were subjected to a temperature of 177° C. in a tubular oven. One minute after the test specimens had been introduced into the oven heated to 177° C., measurement of the concentration of formaldehyde in the oven air commenced. For this purpose, air is drawn out of the tubular oven through a LpDNPH cartridge (LpDNPH cartridge S10 volume 3 mL from Supelco) at a volume flow rate of 1.5 L/min by means of a Xact 5000 pump (from Dräger) for 10 minutes. The cartridge was analyzed by means of HPLC according to DIN 16000-3.

The results of the measurements are compiled in the following table:

| Binder system | Diethyl malonate in binder component | Formaldehyde concentration in the oven air [mg/m$^3$] after 10 minutes |
|---|---|---|
| I First noninventive variant | none | 5 |
| I Second noninventive variant | (i) | 2.2 |
| I Second inventive variant | (i), (ii) | 1.1 |
| II Noninventive variant | none | 6.0 |
| II Inventive variant | (i), (ii) | 4.5 |

Under thermal stress, the test specimens that have been produced with a binder system of the invention release much less formaldehyde than the test specimens produced with a noninventive variant of the corresponding binder system.

1.4 Measurements of Flexural Strength

In order to ensure that the addition of diethyl malonate to the polyisocyanate component of the binder system does not have any adverse effect on the strength of moldings produced with this binder system, flexural strengths of the test specimens produced with various variants of the binder system I were ascertained as a function of various parameters (time after the end of curing, storage time of the molding material mixture prior to the molding, storage conditions of the test specimens produced, coating on the basis of a refractory coating). For details we refer to the table that follows. The terms in this table have the following meanings:

B core (1 h): Test specimen dipped into refractory-coating composition immediately after curing, stored in a digester at room temperature, tested after 1 h.

D core cold: Test specimen dipped into refractory-coating composition immediately after curing, dried in an oven at 150° C. for 1 h, cooled to room temperature and then tested.

The refractory-coating composition contains water as carrier liquid, and particles of aluminum silicate as refractory.

F core: Test specimen stored at 100% relative air humidity at room temperature for 1 day immediately after curing, and tested immediately after removal from storage.

Each determination was effected on a specially produced test specimen. The results of the measurements are compiled in the following table:

| Variant of binder system I | First noninventive variant | First inventive variant | Second inventive variant |
|---|---|---|---|
| Diethyl malonate in binder component | none | (ii) | (i) and (ii) |
| Flexural strengths | | | |
| No storage of the molding material mixture prior to molding | | | |
| 15 sec after end of curing | 250 | 240 | 260 |
| 1 h after end of curing | 390 | 410 | 410 |
| 24 h after end of curing | 460 | 490 | 490 |
| Storage of the molding material mixture for 1 h prior to molding | | | |
| 15 sec after end of curing | 260 | 250 | 250 |
| 1 h after end of curing | 400 | 400 | 390 |
| 24 h after end of curing | 470 | 470 | 470 |
| Test specimen with coating on the basis of a refractory coating | | | |
| B-1d | 420 | 470 | 450 |
| D cold | 520 | 520 | 530 |
| Storage at 100% air humidity | | | |
| F-1d | 390 | 400 | 420 |

The test specimens produced with inventive variants of the binder system I, under all conditions, show similar flexural strengths to the test specimens produced with the noninventive variants of the binder system I.

2. Production of Cores for the Casting of Brake Disks

Molding material mixtures comprising $H_{32}$ quartz sand as molding material base and one (inventive or noninventive) variant in each case of the binder system I described in point 1.1 were used to produce cores for the casting of brake disks by the cold-box method.

For production of the molding material mixture, the molding material base (100 parts by weight) was initially charged in a mixing vessel. The phenolic resin component (i) (1 part by weight) and the polyisocyanate component (ii) (1 part by weight) of the respective variant of binder system I were then weighed into the mixing vessel in such a way that they do not mix directly. Subsequently, molding material base, phenolic resin component and polyisocyanate component were mixed in a Glass mixer.

The molding material mixture was molded by means of a Laempe LL20 core shooting machine at a shooting pressure of 4 bar (400 kPa) and a shooting time of 2.5 sec. For curing of the binder system in the molded molding material mixture, sparging was effected with dimethylpropylamine (DMPA) at 120° C. at a sparging pressure of 3 bar (300 kPa) by means of a Lüber sparging unit.

The cores were not provided with a coating on the basis of a refractory coating. In order to ascertain the influence of the binder composition on the amount of formaldehyde emissions under thermal stress, the cores were subjected to a thermal treatment under similar conditions to those in the production of coatings on the basis of a refractory coating.

30 cores thus produced were placed into an Elpo drying oven (not identical to the oven that was used for the tests described in point 1.3) that had been preheated to 170° C. A stream of air was passed through the oven at a rate of 1600 m³/h.

Once the cores had been put into the oven and the oven had reached the target temperature of 170° C. again, the sampling for determination of formaldehyde was started. A Xact 5000 pump (from Dräger) with a rod-shaped probe was used. For sampling, the rod-shaped probe was introduced into the offgas pipe of the drying oven, and a volume flow rate of 2 L/min was drawn from the offgas pipe and passed through LpDNPH cartridges (LpDNPH Cartridge S10 volume 3 mL from Supelco) for 15 minutes. The cartridges were analyzed according to DIN ISO 16000-3.

The results of the measurements (double determination; therefore two values in each case) are compiled in the following table:

| Diethyl malonate in binder component | Inventive? | Formaldehyde concentration in the air output [mg/m³] after 15 minutes |
|---|---|---|
| none | no | 0.846/0.781 |
| (ii) | yes | 0.662/0.580 |
| (i), (ii) | yes | 0.492/0.537 |

The cores that had been produced with an inventive variant of the binder system I release much less formaldehyde under thermal stress than the cores produced with the first noninventive variant of binder system I. The reduction in formaldehyde emissions is particularly significant when diethyl malonate has been added to both binder components.

The invention claimed is:

1. An isocyanate composition comprising
   a) one or more isocyanates having at least two isocyanate groups per molecule
   b) one or more β-dicarbonyl compounds, wherein the one or more β-dicarbonyl compounds comprise a dialkyl ester of malonic acid
   c) a solvent which is not an isocyanate, a β-dicarbonyl compound or an aldehyde,
   where the concentration
   a) of the isocyanates is 60% to 89%
   b) of the β-dicarbonyl compounds is 1% to 38%,
   based in each case on the total mass of the isocyanate composition.

2. The composition as claimed in claim 1, wherein
   a) the isocyanates having at least two isocyanate groups per molecule are selected from the group consisting of
   methylenebis(phenyl isocyanates),
   polymethylene polyphenyl isocyanates,
   aliphatic isocyanates,
   cycloaliphatic isocyanates,
   isocyanates having at least two isocyanate groups and one carbodiimide group per molecule,
   isocyanates having at least two isocyanate groups and one uretonimine group per molecule,
   and/or
   c) the solvent is selected from the group consisting of
   dialkyl esters of $C_4$-$C_6$ dicarboxylic acids,
   saturated and unsaturated fatty acid alkyl esters,
   alkylene carbonates,
   liquid hydrocarbons,
   compounds from the group of the alkylsilanes, alkyl/alkoxysilanes, alkoxysilanes, alkylsiloxanes, alkyl/alkoxysiloxanes and alkoxysiloxanes of the formula (I)

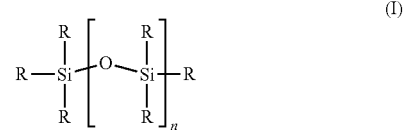

(I)

where n is an integer from 0 to 20, and
each R, independently of the other R, is selected from the group of the alkyl groups having one to 6 carbon atoms and the alkoxy groups having one to 6 carbon atoms.

3. The isocyanate composition of claim 1, wherein the one or more β-dicarbonyl compounds comprise diethyl malonate.

4. The isocyanate composition of claim 1, wherein the one or more β-dicarbonyl compounds comprise dimethyl malonate.

5. A binder system comprising
(i) a phenolic resin component and
(ii) a separate polyisocyanate component,
wherein
(i) the phenolic resin component comprises:
   e) one or more phenolic resins
   f) a solvent,
      wherein, based on the total mass of the phenolic resin component, the concentration of the phenolic resins e) is 40% to 60%,
and
(ii) the polyisocyanate component is an isocyanate composition as defined in claim 1.

6. The binder system as claimed in claim 5, wherein, in the phenolic resin component (i),
e) the phenolic resin is a ortho, ortho'-fused resol having unetherified terminal methylol groups
   and/or
   etherified terminal methylol groups
   and/or
f) the solvent is selected from the group consisting of dialkyl esters of $C_4$-$C_6$ dicarboxylic acids,
saturated and unsaturated fatty acid alkyl esters,
alkylene carbonates,
substances from the group consisting of cashew nut shell oil, components of cashew nut shell oil and derivatives of cashew nut shell oil,
liquid hydrocarbons,
compounds from the group of the alkylsilanes, alkyl/alkoxysilanes, alkoxysilanes, alkylsiloxanes, alkyl/alkoxysiloxanes and alkoxysiloxanes of the formula (I)

$$R-\underset{\underset{R}{|}}{\overset{\overset{R}{|}}{Si}}-\left[O-\underset{\underset{R}{|}}{\overset{\overset{R}{|}}{Si}}-R\right]_n \quad (I)$$

where n is an integer from 0 to 20, and
each R, independently of the other R, is selected from the group of the alkyl groups having one to 6 carbon atoms and alkoxy groups having one to 6 carbon atoms.

7. The binder system as claimed in claim 5, wherein the phenolic resin component (i) further comprises
g) molecular formaldehyde in a concentration of less than 0.1%,
and/or
h) one or more β-dicarbonyl compounds, and reaction products formed by reacting these β-dicarbonyl compounds with formaldehyde,
and/or
i) monomeric compounds from the group of the phenols in a concentration of 10% or less, where the concentrations are each based on the total mass of the phenolic resin component (i).

8. A process comprising the steps of:
producing a molding material mixture by mixing the phenolic resin component (i) and the polyisocyanate component (ii) of a binder system as claimed in claim 5 with a molding material base, so as to form a molding material mixture comprising the phenolic resin component (i) and the polyisocyanate component (ii) of the binder system and a molding material base,
molding the molding material mixture,
curing the binder system in the molded molding material mixture to form a molding.

9. The process as claimed in claim 8, wherein the binder system is cured by contacting the molded molding material mixture
with a gaseous tertiary amine or with a mixture of two or more gaseous tertiary amines
or
with a liquid tertiary amine or with a mixture of two or more liquid tertiary amines.

10. The process as claimed in claim 8, wherein the molding is an article from the group consisting of feeders, foundry molds and foundry cores.

11. The process as claimed in claim 8, wherein multiple moldings are formed and combined to give an article from the group consisting of foundry molds and foundry cores.

12. The process as claimed in claim 8, further comprising the steps of
applying a coating composition comprising particles of one or more refractories dispersed in a carrier fluid to the molding, forming a coated molding, the surface of which has regions provided with the coating composition,
subjecting the coated molding to thermal treatment at a temperature above 40° C., preferably in the range from 50° C. to 200° ° C., forming an article from the group consisting of foundry molds and foundry cores, the surface of which has regions in which a coating comprising particles of one or more refractories is disposed.

13. The process as claimed in claim 8, comprising the steps of
producing a molding material mixture by mixing the phenolic resin component (i) and the polyisocyanate component (ii) of a binder system with a molding material base, so as to form a molding material mixture comprising the phenolic resin component (i) and the polyisocyanate component (ii) of the binder system and a molding material base,
producing two or more moldings, each by molding the molding material mixture and curing the binder system in the molded molding material mixture,
applying a coating composition comprising particles of one or more refractories dispersed in a carrier fluid to the one, more than one or all moldings, forming coated moldings, the surfaces of which have regions provided with the coating composition,
combining the moldings, where one, more than one or all moldings are coated moldings, to give a combined molding,
subjecting the combined molding to thermal treatment at a temperature above 40° C., preferably in the range from 50° ° C. to 200° C., giving an article from the group consisting of foundry molds and foundry cores, the surface of which has regions in which a coating comprising particles of one or more refractories is disposed;

wherein:
the phenolic resin component (i) comprises:
- e) one or more phenolic resins, and
- f) a solvent, wherein, based on the total mass of the phenolic resin component, the concentration of the phenolic resin is e) is 40% to 60%; and the isocyanate component (ii) comprises:
- a) 60 to 89% of one or more isocyanates having at least two isocyanate groups per molecule,
- b) 1 to 38% of one or more β-dicarbonyl compounds, and
- c) a solvent which is not an isocyanate, a β-dicarbonyl compound or an aldehyde, based on the total mass of the isocyanate composition.

* * * * *